(12) United States Patent
Murakami

(10) Patent No.: US 10,824,237 B2
(45) Date of Patent: Nov. 3, 2020

(54) SCREEN DISPLAY CONTROL METHOD AND SCREEN DISPLAY CONTROL SYSTEM

(71) Applicant: SHARP KABUSHIKI KAISHA, Sakai, Osaka (JP)

(72) Inventor: Yoshinori Murakami, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 72 days.

(21) Appl. No.: 16/184,549

(22) Filed: Nov. 8, 2018

(65) Prior Publication Data

US 2019/0138106 A1 May 9, 2019

(30) Foreign Application Priority Data

Nov. 9, 2017 (JP) .................................. 2017-216380

(51) Int. Cl.
| | |
|---|---|
| *G06F 3/033* | (2013.01) |
| *G06F 3/01* | (2006.01) |
| *G06T 7/73* | (2017.01) |
| *G06T 7/90* | (2017.01) |
| *G06T 7/13* | (2017.01) |
| *G06F 3/03* | (2006.01) |
| *G06F 1/16* | (2006.01) |

(52) U.S. Cl.
CPC .............. *G06F 3/017* (2013.01); *G06F 1/163* (2013.01); *G06F 3/011* (2013.01); *G06F 3/0304* (2013.01); *G06T 7/13* (2017.01); *G06T 7/73* (2017.01); *G06T 7/90* (2017.01); *G06T 2207/30196* (2013.01)

(58) Field of Classification Search
CPC ...... G06F 3/017; G06F 3/0386; G06F 3/0304; G06F 1/163; G06F 3/011; G06T 7/73; G06T 7/90; G06T 7/13; G06T 2207/30196; G02B 27/01; G06G 2203/048
See application file for complete search history.

(56) References Cited

U.S. PATENT DOCUMENTS

2016/0170603 A1* 6/2016 Bastien ..................... G06T 7/80
348/49

FOREIGN PATENT DOCUMENTS

JP 2015-230496 A 12/2015

OTHER PUBLICATIONS

Yuki Tanaka, et al., "Air Rendering System with Fingertip Locus by Head Position and Pose Tracking from Camera Image and Sensor", Information Processing Society of Japan Technical Reports, Mar. 13, 2015, vol. 2015-HCI-162, No. 7.

* cited by examiner

*Primary Examiner* — Adam R. Giesy
(74) *Attorney, Agent, or Firm* — ScienBiziP, P.C.

(57) ABSTRACT

A screen display control method includes: by using a wearable terminal to be attached to a head of an operator to capture an image, capturing, with an image of a display having a rectangular frame and a viewport, an image of a hand portion with which the operator points to the display; by using a computer, extracting positions of vertexes of the rectangular frame in the captured image by the wearable terminal and a position pointed by the hand portion; determining, based on a position relation of the extracted positions of the vertexes and the extracted pointed position, whether a position in the viewport corresponding to the hand portion is present; and causing a pointer to be displayed at the position if present.

14 Claims, 12 Drawing Sheets

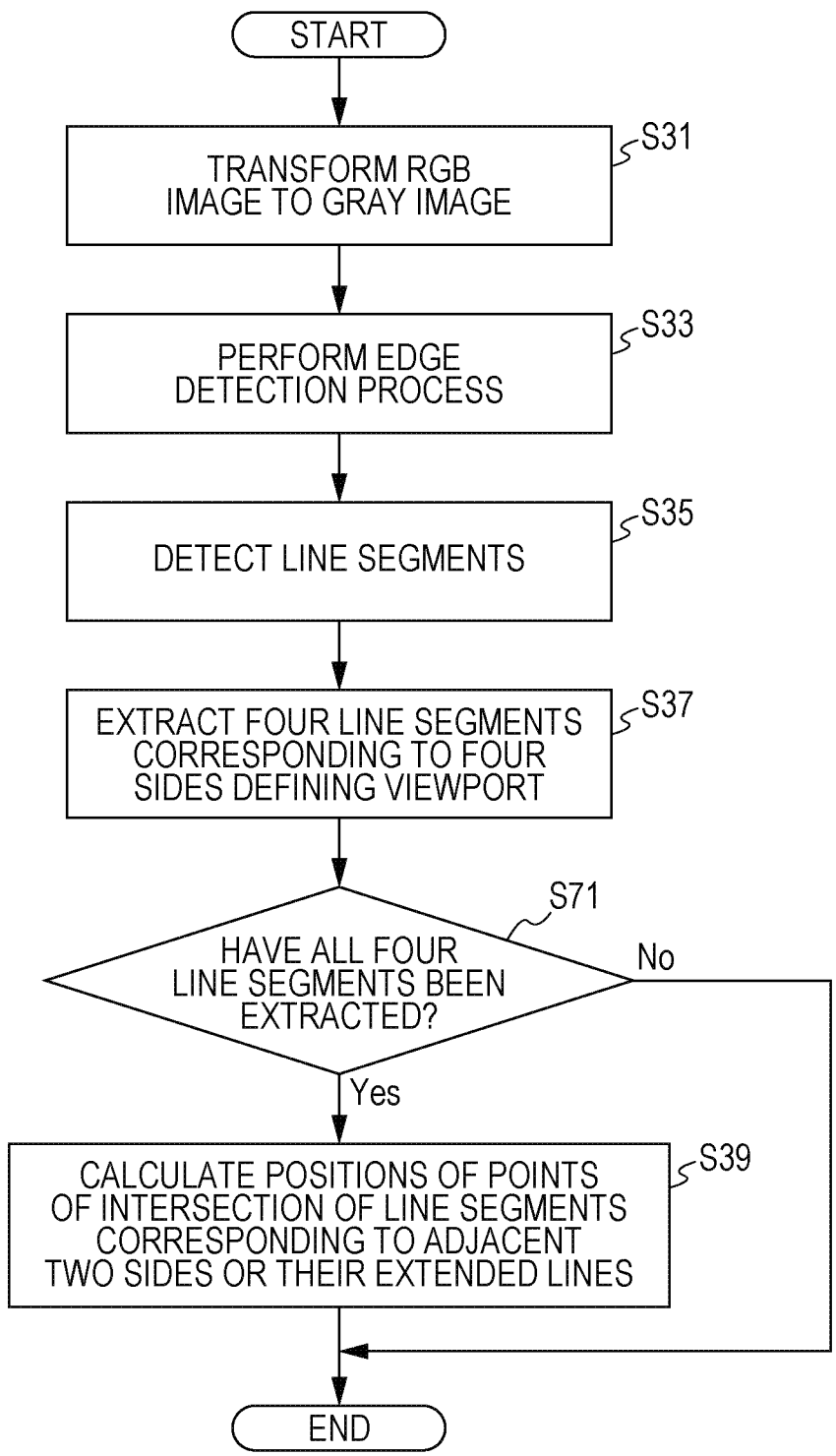

SCREEN DISPLAY CONTROL METHOD AND SCREEN DISPLAY CONTROL SYSTEM

BACKGROUND

1. Field

The present disclosure relates to screen display control methods and screen display control systems and, in more detail, to a technique in which an operator has a wearable terminal attached thereto to remotely operate a pointer without touching a display.

2. Description of the Related Art

A technique has been known in which a sensor attached to the head and a camera image are used to calculate coordinate positions of a finger, marker, or the like in the camera from the camera image and the shape and operation are recognized based on the calculated coordinate positions.

For example, in Yuki Tanaka, et al., "Air Rendering System with Fingertip Locus by Head Position and Pose Tracking from Camera Image and Sensor", Information Processing Society of Japan Technical Reports, Mar. 13, 2015, Vol. 2015-HCI-162, No. 7, a system is aimed in which a sensor attached to the head and a camera image are used to track the position of a fingertip and the acquired locus of the fingertip is displayed on a head mount display (HMD) in a superimposed manner, thereby achieving air rendering with the fingertip locus.

In this system, to find a fingertip locus with the pose of the head corrected, spatial positioning process is performed by using the camera image. For a camera image, local feature points (specifically, feature points known as SURF) are extracted, correspondences of the local feature points between frames of the camera image are established, and a projection transformation matrix is calculated from corresponding points, with a clearly erroneous correspondence removed from sensor information.

Also, although not a wearable terminal, an electrical device has been known which detects a users hand from an input image acquired from an incorporated camera, generates a reduced image of the detected hand and displays the image on an operation screen of a touch panel in a superimposed manner, and executes an instruction in accordance with touch operation at a position of the hand image in the touch panel (for example, refer to Japanese Unexamined Patent Application Publication No. 2015-230496).

However, in the scheme disclosed in the above-described "Air Rendering. System with Fingertip Locus by Head Position and Pose Tracking from Camera Image and Sensor", a sensor is used in addition to the camera, and many local features are handled, thereby resulting in a large calculation amount and long processing time.

Also, in the technique disclosed in Japanese Unexamined Patent Application Publication. No. 2015-230496, when objects are displayed in a congested manner, a hand image of a size smaller than a hands finger directly operating the touch panel is used for operation, thereby reducing erroneous operation. On this point, structures and others are different from those of the present disclosure in which the pointer is operated at a location away from the display.

The present disclosure is made in consideration of the above-described circumstances, and it is desirable to provide a scheme allowing an operator at a location away from a display to be able to operate a pointer at that location. Furthermore, it is desirable to provide a scheme in which a shift between the visual point of an operator and the visual point of image capturing by a wearable terminal attached to the head of the operator is smaller than that when, for example, the wearable terminal is attached to the chest or arm of the operator and a camera in place of the wearable terminal is set on the display, a wall of a room, or the like, and the position of a pointer to be displayed on a display correspondingly to a position pointed by the operator can be determined without discomforting the operator with a small calculation amount.

SUMMARY (1) According to an aspect of the disclosure, there is provided a screen display control method including: by using a wearable terminal to be attached to a head of an operator to capture an image, capturing, with an image of a display having a rectangular frame and a viewport, an image of a hand portion with which the operator points to the display; by using a computer, extracting positions of vertexes of the rectangular frame in the captured image by the wearable terminal and a position pointed by the hand portion; determining, based on a position relation of the extracted positions of the vertexes and the extracted pointed position, whether a position in the viewport corresponding to the hand portion is present; and causing a pointer to be displayed at the position if present.

(2) According to another aspect of the disclosure, there is provided a screen display control program causing a computer to perform: acquiring, from a wearable terminal to be attached to a head of an operator, an image having captured therein a display having a rectangular frame and a viewport and also a hand portion with which the operator points to the display; extracting positions of vertexes of the rectangular frame in the captured image by the wearable terminal and a position pointed by the hand portion; determining, based on a position relation of the extracted positions of the vertexes and the extracted pointed position, whether a position in the viewport corresponding to the hand portion is present; and causing a pointer to be displayed at the position if present.

(3) According to still another aspect of the disclosure, there is provided a screen display control system including: a display having a rectangular frame and a viewport; a wearable terminal to be attached to a head of an operator to capture, with an image of the display, an image of a hand portion with which the operator points to the display; a pointer processing unit which extracts positions of vertexes of the rectangular frame in the captured image by the wearable terminal and a position pointed by the hand portion and determines, based on a position relation of the extracted positions of the vertexes and the extracted pointed position, whether a position in the viewport corresponding to the hand portion is present; and a display processing circuit which causes a pointer to be displayed at the position if present.

BRIEF DESCRIPTION OF THE DRAWINGS

FIG. 12 is a flowchart of a process of calculating positions of vertexes of the viewport in the second embodiment.

DESCRIPTION OF THE EMBODIMENTS

In the following, the present disclosure is further described below by using the drawings. The following description is merely an example in all aspects and is not intended to limit the present disclosure.

First Embodiment

<<Structure of System>>

Figure 1:
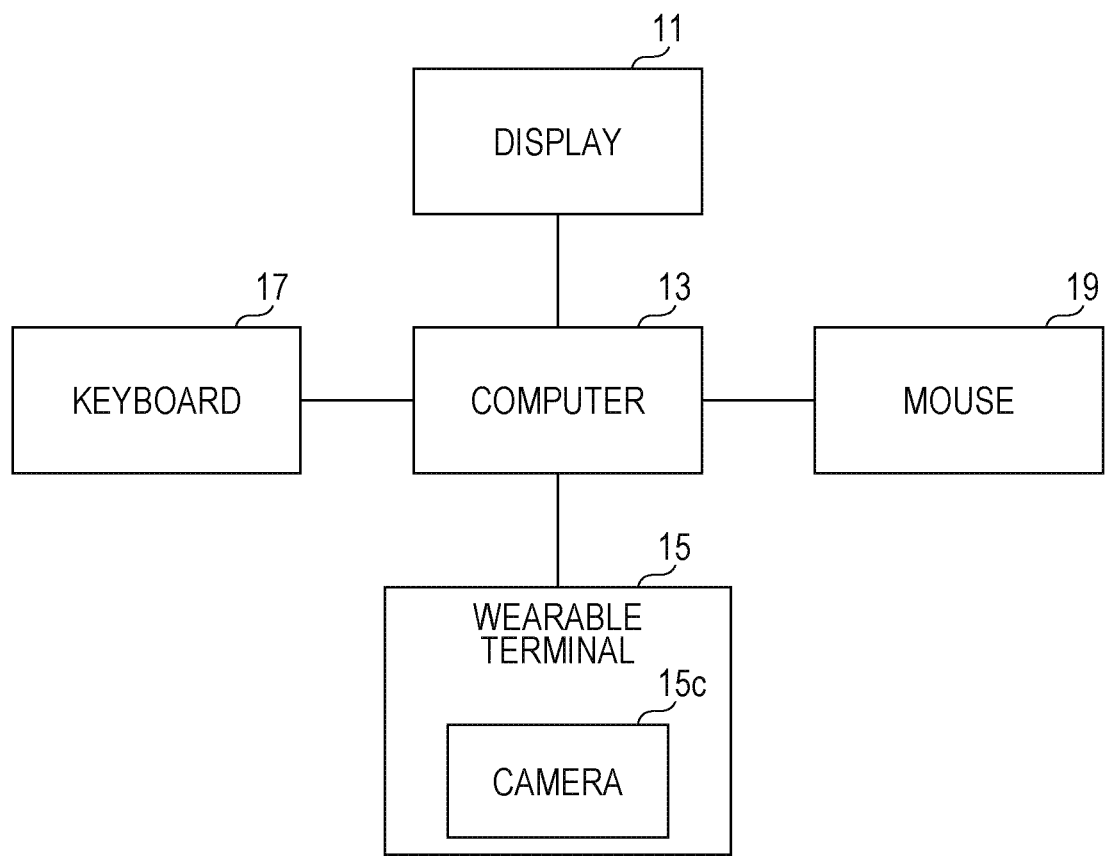
FIG. 1 is a block diagram of the structure of a screen display control system in a first embodiment.

FIG. 1 is a block diagram of the structure of a screen display control system as one embodiment of the present disclosure. The screen display control system depicted in FIG. 1 is configured to include a display 11, a computer 13, a wearable terminal 15, a keyboard 17, and a mouse 19. The wearable terminal 15 has a camera 15c.

The display 11 has a rectangular viewport, that is, a screen region. The display 11 receives an image display signal from the computer 13, and performs image display based on the received image display signal.

The keyboard 17 and the mouse 19 send a signal in accordance with the operation of an operator to the computer 13.

In a meeting or the like, when a plurality of people view a large-sized display and a speaker may desire to point to a portion of the display desired to be described by using a pointer. In this embodiment, the speaker participating in the meeting has a wearable terminal 15 attached at a position close to the eyes of a head 21 of the speaker, who serves as an operator who operates the pointer by using the wearable terminal 15. The wearable terminal 15 has the camera 15c, and the camera 15c captures a picture and sends the captured image (picture data) to the computer 13. In this embodiment, the picture data includes moving images sequentially captured with a lapse of time, that is, a series of frame images corresponding to a plurality of points of time. In the specification, each frame image is also referred to as a captured image.

Figure 2:
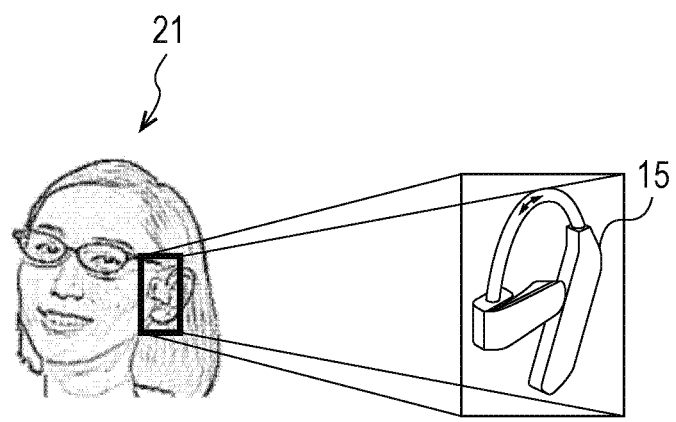
FIG. 2 is a diagram for describing one example of a wearable terminal in the first embodiment.

The picture data may be sent from the wearable terminal 15 to the computer 13 via wired communication, but wireless communication such as infrared communication or Bluetooth® is desirable. The wearable terminal 15 may be integrated with eyeglasses, or may be of an ear-hook type to be worn on the ear as depicted in FIG. 2. It is desirable that the wearable terminal 15 is near the eyes of the operator and an image-capturing direction is near a visual line of the operator.

The computer 13 includes predominantly CPU, and also a memory, an input/output circuit, and a communication interface circuit as hardware resources. By executing a program (software) stored in the memory, the hardware and the software perform processes in conjunction with each other.

The computer 13 receives an input signal from the keyboard 17 and the mouse 19, and performs a process defined in advance based on the received input signal. Also, in accordance with the input signal received from the keyboard 17 and the mouse 19 or in accordance with the result of the process performed based on that input signal, the computer 13 sends an image display signal to the display 11.

Furthermore, the computer 13 receives picture data from the wearable terminal 15, and generates a pointer input signal based on data corresponding to each frame image of the received picture data, that is, each captured image. Here, the pointer input signal is described. The computer 13 extracts a hand portion of the speaker reflected in each captured image and, when determining that the extracted hand portion indicates some operation corresponding to the operation by the mouse 19, generates a signal corresponding to the input signal from the mouse 19. This signal is the pointer input signal.

In the above, the wearable terminal 15 transmits the picture data captured by the camera 15c to the computer 13 and the computer 13 processes the picture data to generate the pointer input signal. This process may be performed partially or entirely on a wearable terminal 15 side. That is, the wearable terminal 15 may include a computer and perform processes in conjunction with the computer 13. This mode is also included in the scope of the present disclosure.

Based on the generated pointer input signal, the computer 13 performs a process defined in advance. Also, as with the case of receiving an input signal from the mouse 19, in accordance with the pointer input signal or in accordance with the result of the process performed based on that pointer input signal, the computer 13 transmits an image display signal to the display 11.

<<General Outline of Process of Updating Display of Pointer Based on Captured Image>>

Next, a process of calculating a pointer input signal from each captured image of the picture data is described in detail.

Figure 3:
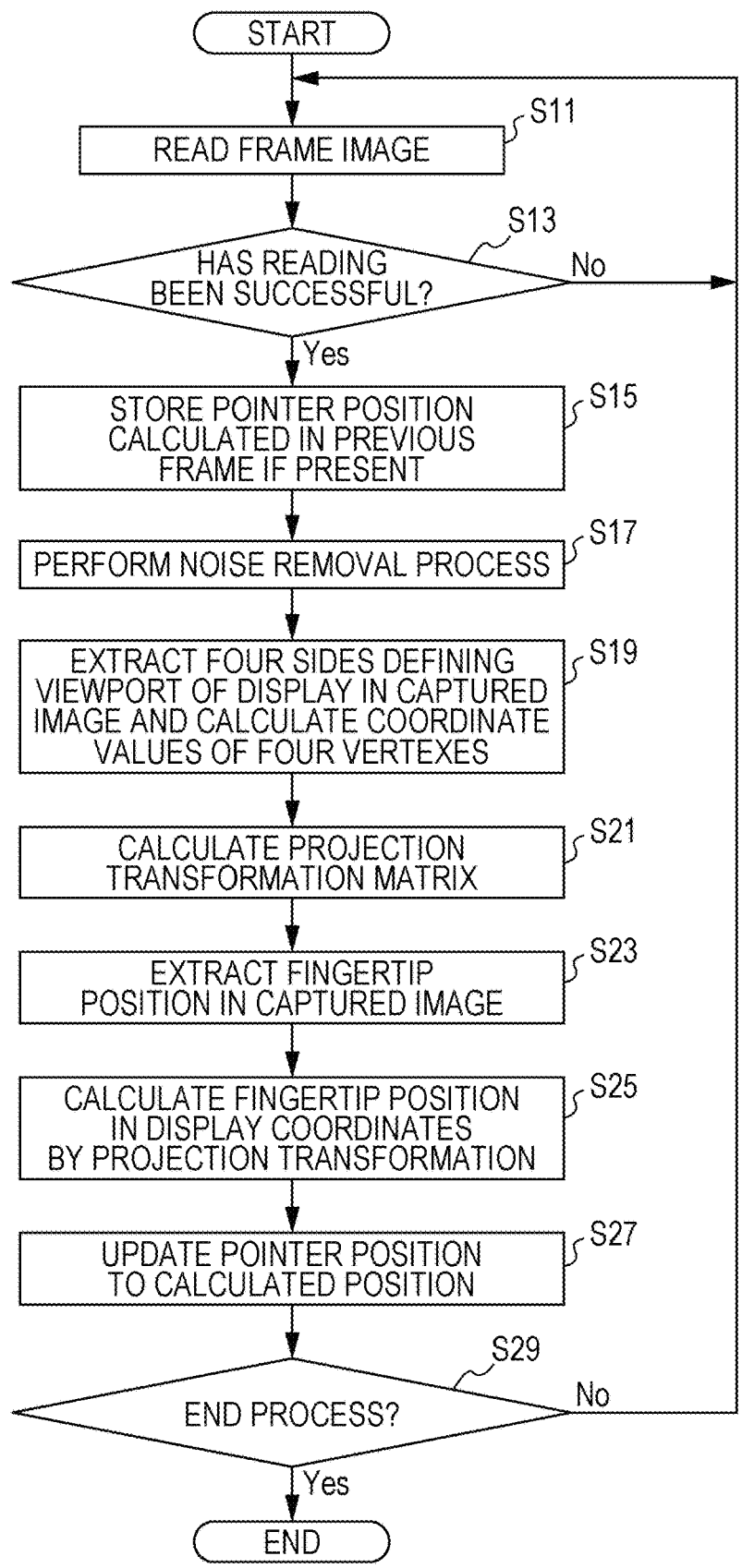
FIG. 3 is a flowchart of a process flow of screen display control in the first embodiment.

FIG. 3 is a flowchart of a process flow of calculating a pointer input signal based on a captured image corresponding to each frame in the present embodiment. As depicted in FIG. 3, the computer 13 receives a captured image corresponding to one frame of picture data transmitted from the wearable terminal 15 and stores the captured image in the memory (step S11). If the captured image has been read (Yes at step S13), the computer 13 checks whether a pointer position calculated based on the frame image previously processed is present, and retains the calculated pointer position in the memory if present (step S15). The pointer position based on the previous frame image is retained in preparation for cases where the four sides of the display region are not extracted or the fingertip position in the captured image is not extracted even if a process described below is applied to the frame image stored in the memory at the above-described step S11, and also to be able to not simply move the pointer but also address an operation of rendering corresponding to the locus of the pointer. Details are described later.

Next, the computer 13 performs a noise removal process on the captured image stored in the memory at the above-described step S11 (step S17).

The computer 13 may perform one loop of the process depicted in FIG. 3 for each frame of the picture data transmitted from the wearable terminal 15 to update the display of the pointer. However, the processing load is large, and it may be difficult to perform the loop process for each frame. In that case, the computer 13 may perform one loop of the process depicted in FIG. 3 for every plurality of frames of the image data. The magnitude of the processing load depends on the frame rate (time intervals) of picture data, the number of pixels of each frame image, communication speed between the wearable terminal 15 and the computer 13, the processing capacity of the computer 13, and so forth.

The computer 13 then calculates coordinates of four vertexes defining a viewport of the display 11 reflected in the captured image (step S19).

The positions of the four vertexes reflected in the captured image does not form a rectangle if the operator is shifted from a position directly confronting the display 11, and forms, for example, a trapezoidal shape, or quadrilateral shape other than the trapezoidal shape. When the operator points to a position viewed by the eyes of the operator with a hand finger or the like, an image captured from the visual point of the operator is used to accurately find the pointed position. In the present embodiment, since the wearable terminal 15 is attached to the head of the operator, the image captured by the camera 15c does not completely match but is close to an image from the visual point of the operator.

Thus, the computer 13 assumes that the captured image by the camera 15c is viewed from the visual point of the operator, and performs a process of calculating the position where the operator points to the viewport of the display 11 in the captured image.

However, as described above, if the captured image is not at the position directly confronting the display 11, the four vertexes of the viewport does not form a rectangle, and therefore the position pointed by using the rectangular coordinates are not accurately represented.

Thus, projection transformation is performed based on the premise that the four vertexes form a rectangle, and coordinates corresponding to a rectangular viewport at the pointed position are found.

For this, the computer 13 first calculates a projection transformation matrix for transforming the positions of the four vertexes on the captured image distorted by projection transformation to form a rectangle (step S21).

Next, the computer 13 extracts the pointed position in the captured image (step S23). In the present embodiment, the positron of a finger-tip (fingertip position) of the hand portion is taken as the pointed position.

Then, by using projection transformation by applying the projection transformation matrix calculated at the above-described step S21 to the position pointed on the captured image found at the above-described step S23, the computer 13 calculates the fingertip position corresponding to the rectangular viewport (step S25). That is, the computer 13 calculates coordinates of the fingertip position when the coordinates of the viewport are represented in the rectangular coordinate system.

If the calculated fingertip position is with the viewport, the computer 13 updates the position of the pointer to be displayed in the viewport to the calculated position (step S27).

Next, the computer 13 check whether a frame image to be processed next comes from the wearable terminal 15 (step S29).

If a frame image to be processed next does not come (Yes at step S29), the computer 13 ends the process. On the other hand, if a frame image to be processed next comes (No at step S29), the routine returns to the above-described step S11 to read the next frame image and repeats processes similar to those described above.

The above is the process flow depicted in FIG. 3.

<<Process of Extracting Four Vertexes of Display from Captured Image>> in the present embodiment, each captured image is image data formed of color components of RGB (here, R refers to red, G refers to green, and B refers to blue). The camera 15c according to the present embodiment includes an image sensor. Generally speaking, the image sensor outputs a captured image as a signal of RGB color components, and therefore each captured image received by the computer 13 from the wearable terminal 15 is formed of RGB color components.

When a power supply is turned ON and the wearable terminal 15 starts operation, the camera 15c starts capturing moving images. The wearable terminal 15 then sequentially transmits captured picture data to the computer 13. The computer 13 receives frame images sent from the wearable terminal 15.

As will be described below, the computer 13 determines whether a position of the pointer to be displayed so as to correspond to that frame is present in the received captured image and determines that position if present. When receiving a captured image of the next frame, the computer 13 determines whether a position of the pointer to be displayed so as to correspond to that frame is present and determines that position if present. Here, the position of the pointer determined based on the previous frame image is retained.

When the camera image has many noise components, a median filter, average filter, or the like may be applied to the captured frame image to remove the noise.

In the present embodiment, when the operator having the wearable terminal 15 attached on the head looks at the direction of the display 11, the display 11 is reflected in the camera 15c. That is, when the operator looks ahead with the camera 15c attached to the head of the operator, the camera 15c captures an image of a certain forward range reflected in the eyes of the operator.

The computer 13 calculates coordinates of the four vertexes of the display 11 reflected in toe camera 15c on the captured image. This process corresponds to step S19 of FIG. 3.

Figure 4:
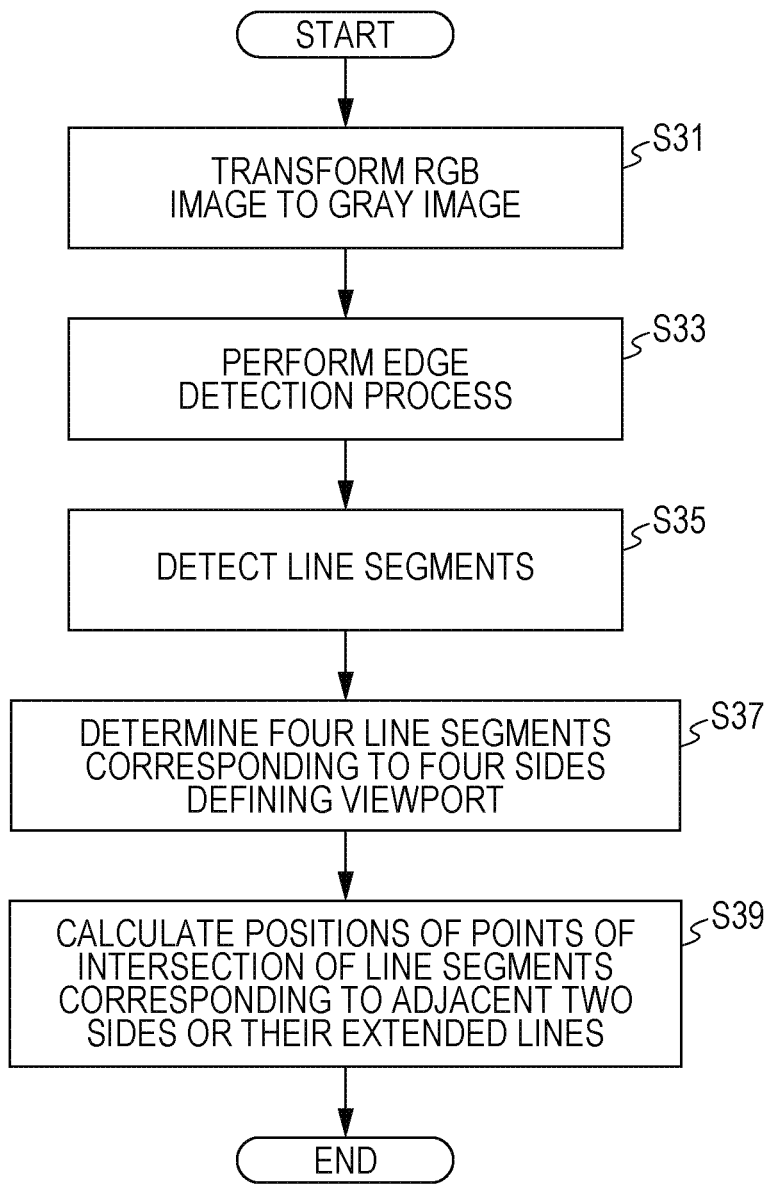
FIG. 4 is a flowchart of details of a process of calculating coordinate values of four vertexes of a viewport in FIG. 3.

FIG. 4 is a flowchart of details of that process. As depicted in FIG. 4, the computer 13 transforms the captured image formed of RGB color components to a gray image (step S31).

In the present embodiment, an RGB three-color signal (brightness signal) is transformed to a gray brightness signal Gray by the following Equation (1).

$$\text{Gray} = 0.299 \times R + 0.587 \times G + 0.114 \times B \quad (1)$$

Equation (1) is known as an equation for calculating a luminance of an RGB signal.

Note that when the captured image has many noise, a noise removal process may be performed on the RGB image or the gray image after transformation.

The computer 13 performs edge detection on the gray image after transformation (step S33). For example, the computer 13 detects the edge of the gray image by using a method called Canny's method (step S33). With this, portion corresponding to a frame (display frame) of the display 11 is also detected as an edge. An inner peripheral portion of the frame corresponds to a boundary of the viewport. If the type of the display 11 for use is determined in advance and the color of the display frame is black or white, the portion corresponding to the frame color may be extracted by binarization and then an edge may be detected by a Laplacian filter.

On the transformed image for an edge detection image, the computer 13 performs stochastic Hough transformation to detect line segments (step S35). Line segment detection is a process of detecting a line as a line segment having endpoints from the captured image. The detected line segments are each represented by a start point and a terminal point, and their coordinates can be respectively acquired.

Figure 5:
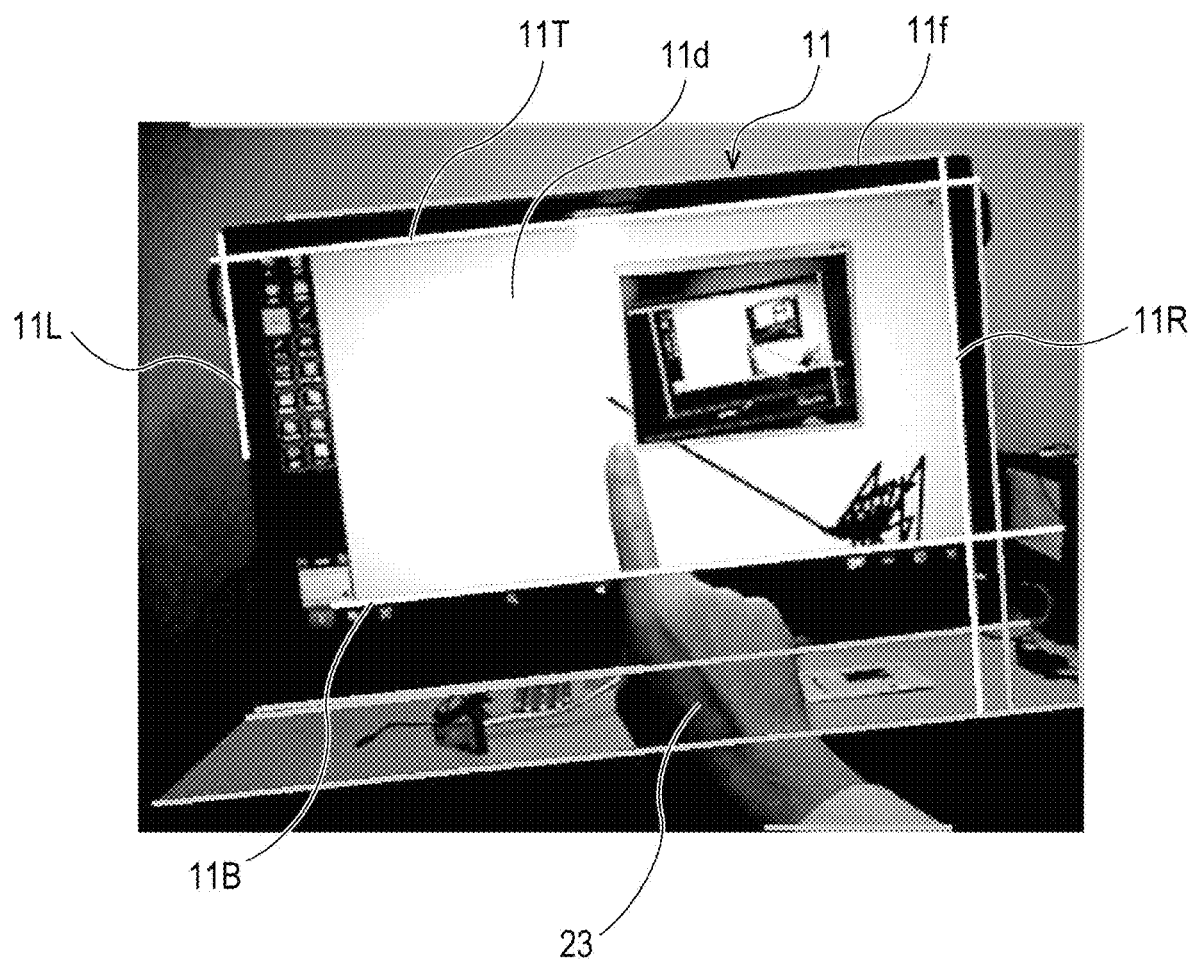
FIG. 5 is a diagram for describing an example of detection of four line segments defining the viewport in the first embodiment.

FIG. 5 is a diagram for describing an example of detection of line segments from the captured image having reflected therein the display 11 and the hand portion of the operator in the present embodiment through the above-described procedure.

In FIG. 5, four sides defining a viewport 11d of the display 11, in other words, four sides corresponding to the inner periphery of a display frame 11f, are represented by white lines. That is, a viewport lower side 11B, a viewport left side 11L, a viewport right side 11R, and a viewport upper side 11T are represented by white lines. The line segments extracted from the captured image are not only the above, and line segments extracted other than the above-described four sides are represented in gray. The outer periphery of the display frame 11f, the edge of a desk where the display 11 is placed, and the edge of the captured image are extracted as line segments.

The computer 13 determines four sides defining the viewport 11d of the display 11 from among the extracted line segments (step S37).

In the present embodiment, the procedure of determining four sides is as follows.

Among the detected line segments having a gradient being substantially horizontal (defined, for example, with an absolute value of (length of longitudinal components/length of lateral components) being smaller than 0.5) and having a length longer than a length defined in advance, the computer 13 takes a line segment positioned above and closest to the image center of the captured image as the viewport upper side 11T. On the other hand, the computer 13 takes a line segment positioned below and closest to the image center as the viewport lower side 11B.

Here, the line segment positioned above and closest to the image center is a line segment which crosses a vertical line (a line parallel to the Y coordinate axis) passing through the image center and extending in the vertical direction (Y direction) or an extended line of that line segment, which is positioned above and closest to the image center on the vertical line.

On the other hand, the line segment positioned below and closest to the image center is a line segment which crosses the vertical line (the line parallel to the Y coordinate axis) passing through the image center and extending in the vertical direction. (Y direction) or an extended line of that line segment, which is positioned below and closest to the image center on the vertical line.

Furthermore, among the detected line segments having a gradient being substantially vertical (defined, for example, with an absolute value of (length of longitudinal components/length of lateral components) being larger than 5) and having a length longer than a length defined in advance (which may be different from the length regarding the above-described viewport upper side 11T and the viewport lower side 11B), the computer 13 taxes a line segment positioned on a left side of and closest to the image center of the captured image as the viewport left side 11L. On the other hand, the computer 13 takes a line segment positioned on a right side of and closest to the image center as the viewport right side 11R.

Here, the line segment positioned on the left side of and closest to the image center is a line segment which crosses a horizontal line (a line parallel to the X coordinate axis) passing through the image center and extending in the horizontal direction (X direction) or an extended line of that line segment, which is positioned on the left side of and closest to the image center on the horizontal line.

The line segment positioned on the right side of and closest to the image center is a line segment which crosses the horizontal line (the line parallel to the X coordinate axis) passing through the image center and extending in the horizontal direction (X direction) or an extended line of that line segment, which is positioned on the right side of and closest to the image center on the horizontal line.

Of the line segments depicted in FIG. 5, line segments represented in white correspond to four sides defining the viewport 11d.

In the present embodiment, the four vertexes of the display 11 are assumed to be calculated based on the viewport 11d of the display 11, because the viewport 11d is defined by a boundary between the display panel such as a liquid crystal or organic EL and a frame member (frame 11f) surrounding the display panel and the boundary is thought to be able to be stably and accurately extracted.

However, this is not meant to be restrictive. For example, the four vertexes may be calculated based on the outer periphery of the display frame 11f surrounding the viewport 11d or the outer edge of the display (that is, the contour of the entire display apparatus). In recent years, the outer periphery of the display frame 11f often corresponds to the outer edge of the display. For example, a loudspeaker may be arranged below or on both left and right sides of the display frame 11f. In general, the periphery of the frame member and the outer edge of the display are often in the shape of a rectangle.

From the four line segments corresponding to the four sides defining the viewport 11d, the computer 13 calculates points of intersection of line segments corresponding to adjacent two sides or their extended lines as four vertexes step S39). That is, the computer 13 calculates a point of intersection of line segments corresponding to the viewport upper side 11T and the viewport left side 11L or their extended lines, a point of intersection of line segments corresponding to the viewport left side 11L and the viewport lower side 11B or their extended lines, a point of intersection of line segments corresponding to the viewport lower side 11B and the viewport right side 11R or their extended lines, and a point of intersection of line segments corresponding to the viewport right side 11R and the viewport upper side 11T or their extended lines. Thus, the coordinates of the four vertexes of the display 11 in the captured image can be found.

Here, the procedure of finding a point of intersection of two sides adjacent to each other on the captured image is described.

Figure 6A:
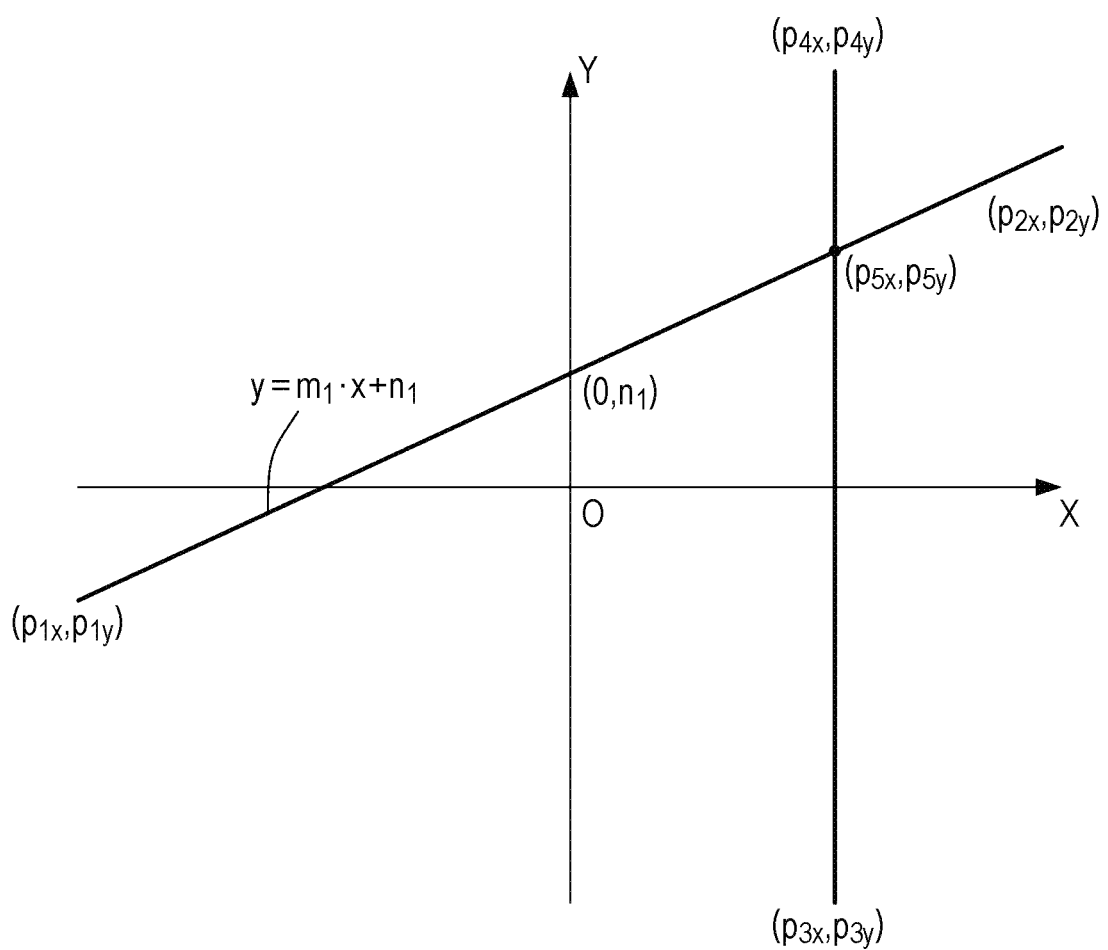
FIG. 6A is a graph for describing a procedure of calculating coordinates of a point of intersection of two sides in the first embodiment.

FIG. 6A is a graph for describing the procedure of calculating coordinates of the point of intersection of two straight lines in the present embodiment. As depicted in FIG. 6A, as for one straight line of two sides, the gradient of the straight line is taken as being substantially horizontal, and the coordinate values of both end points are taken as $(p_{1x}, p_{1y})$ and $(p_{2x}, p_{2y})$. The straight line is represented by the following Equation (2).

$$y = m_1 \cdot x + n_1 \quad (2)$$

The other one straight line of the two sides extends to a vertical direction in parallel with the y axis. The coordinates of both end points are taken as $(p_{3x}, p_{3y})$ and $(p_{4x}, p_{4y})$.

The coordinate value of the point of intersection of the two straight lines is taken as $(p_{5x}, p_{5y})$.

When the coordinates $(p_{1x}, p_{1y})$, $(p_{2x}, p_{2y})$, $(p_{3x}, p_{3y})$, and $(p_{4x}, p_{4y})$ of the endpoints of the two straight lines are know, the coordinate values $(p_{5x}, p_{5y})$ of the point of interaction can be calculated as follows.

Since the coordinate values of the endpoints of the two straight lines are determined, the values of the endpoints are substituted into Equation (2) as follows.

$$p_{1y} = m_1 \cdot p_{1x} + n_1 \quad (2\text{-}1)$$

$$p_{2y} = m_1 \cdot p_{2x} + n_1 \quad (2\text{-}2)$$

Then, when Equation (2-1) is subtracted from Equation (2-2) to remove $n_1$ for arrangement as to $m_1$, $m_1 = (p_{2y} - p_{1y})/(p_{2x} - p_{1x})$.

On the other hand, to remove $m_1$ from both equations, when an equation obtained by multiplying Equation (2-2) by $p_{1x}$ is subtracted from an equation obtained by multiplying Equation (2-1) by $p_{2x}$ for arrangement as to $n_1$, $n_1 = (p_{2x} \times p_{1y} - p_{1x} \times p_{2y})/(p_{2x} - p_{1x})$.

Thus, coefficients $m_1$ and $n_1$ have been found. By substituting the found $m_1$ and $n_1$ into Equation (2), the substantially horizontal straight line can be represented.

On the other hand, as for the straight line parallel to the y axis, since $p_{3x} = p_{4x}$, the x coordination value of the point of intersection is found by $$p_{5x} = p_{3x}.$$

The y coordinate value of the point of intersection is found by $$p_{5y} = m_1 \times p_{3x} + n_1.$$

Figure 6B:
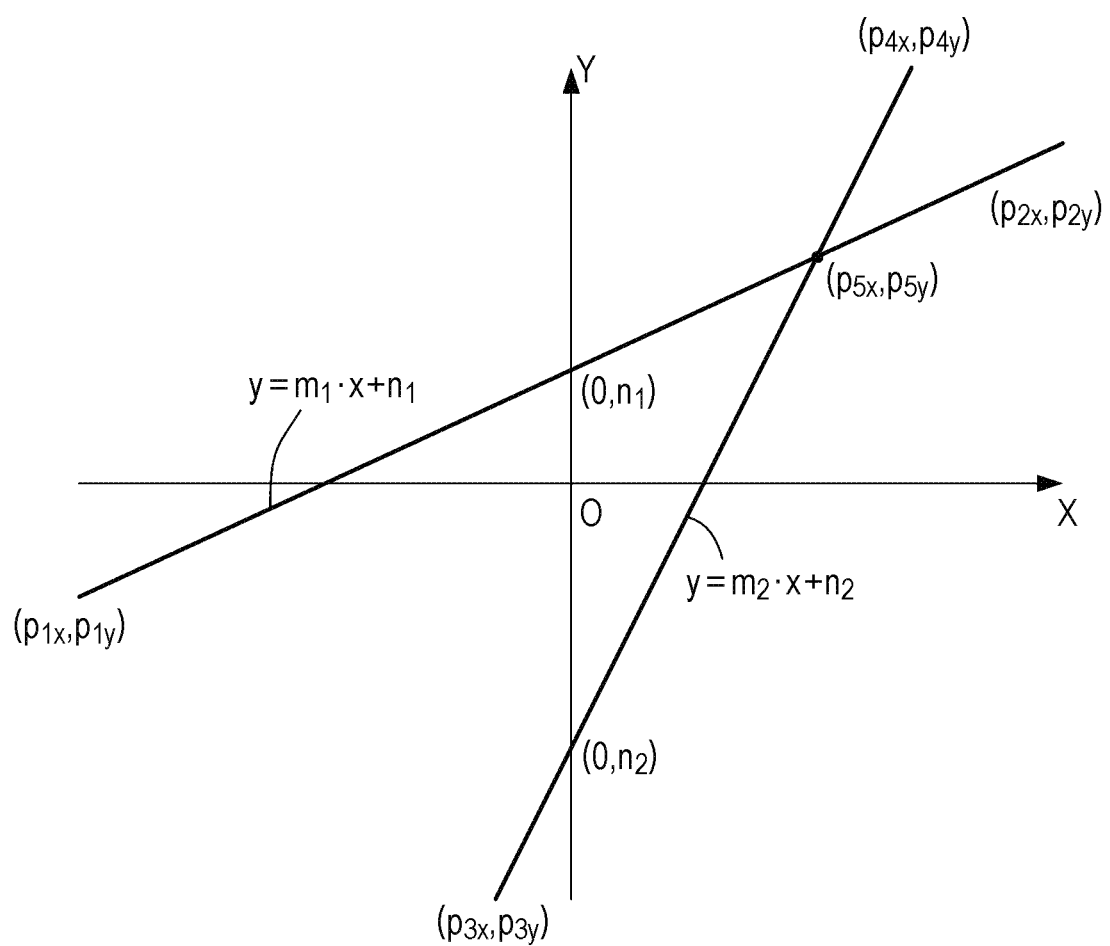
FIG. 6B is a graph of two sides in a mode different from that of FIG. 6A.

FIG. 6B is a graph of two sides in a mode different from that of FIG. 6A. The substantially horizontal straight line is similar to that of FIG. 6A. On the other hand, in place of the straight line extending to the vertical direction in FIG. 6A, a straight line in a substantially vertical direction is depicted in FIG. 6B. The straight line in the substantially vertically direction is represented by the following Equation 3.

$$y = m_2 \cdot x + n_2 \quad (3)$$

The coordinate values $(p_{1x}, p_{1y})$, $(p_{2x}, p_{2y})$, $(p_{3x}, p_{3y})$, and $(p_{4x}, p_{4y})$ of endpoints of two straight lines represented by Equations (2) and (3) are known.

Thus, as with FIG. 6A, from Equations (2-2) and (2-1), the coefficient $m_1$ and $n_1$ are found. By substituting the found $m_1$ and $n_1$ into Equation (2), the substantially horizontal straight line can be represented.

Also as for the straight line represented by Equation (3), the coefficients $m_2$ and $n_2$ are found through a procedure similar to that for the straight line in Equation (2).

$$m_2 = (p_{4y} - p_{3y})/(p_{4x} - p_{3x})$$

$$n_2 = (p_{4x} \times p_{3y} - p_{3x} \times p_{4y})/(p_{4x} - p_{3x})$$

By substituting the found $m_2$ and $n_2$ into Equation (3), the straight line in the substantially vertical direction can be represented.

At a point of intersection of the straight line in the substantially horizontal direction and the straight line in the substantially vertical direction, the following holds.

$$p_{5y} = m_1 \cdot p_{5x} + n_1 \quad (4)$$

$$p_{5y} = m_2 \cdot p_{5x} + n_2 \quad (5)$$

From Equations (4) and (5), the coordinate value of the point of intersection is found by $$p_{5x} = (n_1 - n_2)/(m_2 - m_1) \text{ and}$$

$$p_{5y} = (m_2 \times n_1 - m_1 \times n_2)/(m_2 - m_1).$$

In the above-described procedure, by calculating the coordinate values of the point of intersection of two sides adjacent to each other on the captured image, it is possible to find the coordinates of the four vertexes of the display 11 on the captured image.

Note that the direction of the camera 15c and the direction of the visual line of the operator may be different and the display 11 may not be reflected in the captured image. Alternatively, an obstacle may be present in front of the display 11 to hide the display 11 and the display 11 may be only partially reflected. If so, four line segments corresponding to the display frame 11f may not be appropriately extracted, and the coordinates 11f of the four vertexes of the display 11 may not be calculated. The process in that case will be described in a second embodiment.

<<Process of Finding Distortion Correction-Projection Transformation Matrix H of Four Vertexes>>

The display 11 reflected in the captured image is reflected as being distorted unless the camera 15c is at a position directly confronting the display 11. The distortion has an influence also on the position in the viewport 11d pointed by the operator.

Thus, by using the coordinate values of four vertexes of the display 11, the coordinate values of the fingertip position in the captured image are corrected to reduce the influence of distortion. The distortion can be corrected by projection transformation, which is one type of geometric transformation. Thus, a projection transformation matrix H is calculated to transform the fingertip position on the captured image to rectangular coordinate values of the rectangular viewport.

Figure 7:
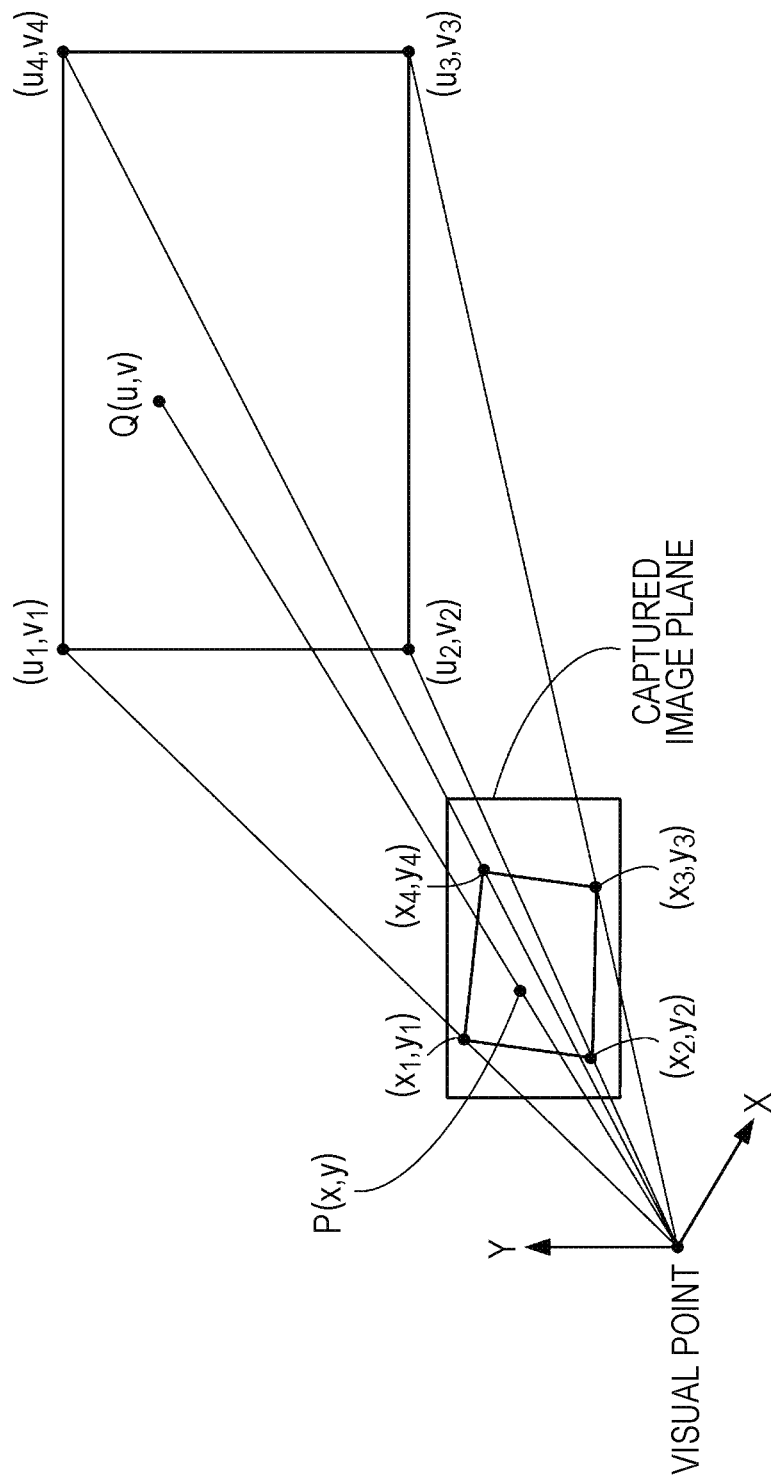
FIG. 7 is a diagram for describing a correspondence between a position on a captured image and a position on the viewport of a display in the first embodiment.

FIG. 7 is a diagram for describing a correspondence between a position on a captured image and a position on the viewport 11d of the display 11 in the present embodiment. As depicted in FIG. 7, a position on a captured image is represented by rectangular coordinates on a captured image plane. The rectangular coordinates on the captured image plane are rectangular coordinates at the visual point of the camera 15c (coordinate axes X, Y, and Z are depicted in FIG. 7), because the captured image is an image having the four vertexes of the viewport 11d reflected therein when the display 11 is viewed from the visual point of the camera 15c.

By using FIG. 6A and FIG. 6B, the procedure of calculating coordinate values of four vertexes of the display 11 reflected in the captured image has already been described. These coordinate values are based on X and Y coordinates.

As depicted in FIG. 7, the coordinate values of the four vertexes of the display 11 on the captured image are taken as $(x_1, y_1)$, $(x_2, y_2)$, $(x_3, y_3)$ and $(x_4, y_4)$. As depicted in F g. 7, since the visual point is not at a position directly confronting the display 11 and the plane including X and Y coordinate axes is not parallel to the display surface of the display 11, the four vertexes on the captured image are reflected as being distorted.

On the other hand, the four vertexes of the rectangular viewport 11*d* in the present embodiment are represented by coordinate values in units of pixels by using the rectangular coordinates on the viewport 11*d*(coordinate axes U, V, and W are depicted in FIG. 7).

For example, the viewport 11*d* is assumed to be configured of 1920 pixels in a horizontal direction (U-axis direction or lateral direction) and 1200 pixels in a vertical direction (V-axis direction or longitudinal direction). In that case, coordinate values $(u_1, v_1)$, $(u_2, v_2)$, $(u_3, v_3)$, and $(u_4, v_4)$ of four vertexes of the viewport 11*d* are (0, 0), (0, 1199), (1919, 1199), and (1919, 0).

In the following, a procedure of finding a projection transformation matrix for associating the coordinate values $(x_1, y_3)$, $(x_2, y_2)$, $(x_3, y_3)$, and $(x_4, y_4)$ of the four vertexes on the captured image with four vertexes of the rectangular viewport 11*d* corresponding to these four vertexes is described. The coordinate values of the four vertexes of the viewport 11*d* are taken as $(u_1, v_1)$, $(u_2, v_2)$, $(u_3, v_3)$, and $(u_4, v_4)$.

A correspondence between the coordinate values $(x_1, y_1)$, $(x_2, y_2)$, $(x_3, y_3)$, and $(x_4, y_4)$ of four vertexes in a rectangular coordinate system representing positions on the captured image and the coordinate values $(u_1, v_1)$, $(u_2, v_2)$, $(u_3, v_3)$, and $(u_4, v_4)$ of four vertexes of the rectangular viewport 11*d* are taken as being represented by the following four equations by using the projection transformation matrix H.

$$\lambda \begin{bmatrix} u_1 \\ v_1 \\ 1 \end{bmatrix} = H \begin{bmatrix} x_1 \\ y_1 \\ 1 \end{bmatrix}, \lambda \begin{bmatrix} u_2 \\ v_2 \\ 1 \end{bmatrix} = H \begin{bmatrix} x_2 \\ y_2 \\ 1 \end{bmatrix}, \lambda \begin{bmatrix} u_3 \\ v_3 \\ 1 \end{bmatrix} = H \begin{bmatrix} x_3 \\ y_3 \\ 1 \end{bmatrix},$$

$$\lambda \begin{bmatrix} u_4 \\ v_4 \\ 1 \end{bmatrix} = H \begin{bmatrix} x_4 \\ y_4 \\ 1 \end{bmatrix}$$

Not only the four vertexes but points (x, y) on the captured image and their corresponding points (u, v) on the viewport 11*d* are represented by $$\lambda \begin{bmatrix} u \\ v \\ 1 \end{bmatrix} = H \begin{bmatrix} x \\ y \\ 1 \end{bmatrix} \quad (6)$$

In any of the above equations, however, the projection transformation matrix H is represented by $$H = \begin{bmatrix} h_{11} & h_{12} & h_{13} \\ h_{21} & h_{22} & h_{23} \\ h_{31} & h_{32} & 1 \end{bmatrix} \quad (7)$$

and the values of coefficients $h_{11}$ to $h_{32}$ are the same in any equation. Note that λ is a coefficient defined so that the constant element on the third row and the third column in the projection transformation matrix H of Equation (7) is "1", and that value is the same in any equation.

The eight coefficients $h_{11}$ to $h_{32}$ in the projection transformation matrix H can be calculated based on the fact that each of the coordinate values $u_1$ to $u_4$, $x_1$ to $x_4$, $v_1$ to $v_4$, and $y_1$ to $y_4$ of the corresponding four vertexes are known.

Once the coefficients $h_{11}$ to $h_{32}$ in the projection transformation matrix H are found, the points (u, v) on the viewport 11*d* corresponding to any points (x, y) on the captured image can be determined by using Equation (6).

Therefore, also as for the fingertip position reflected in the captured image, the corresponding position on the viewport 11*d* can be determined by using Equation (6).

<<Process of Extracting Fingertip Position on Captured Image>>

Next, the procedure of detecting a fingertip position of the operator reflected in the captured image and finding coordinate values (represented by P(x, y) in FIG. 7) of the fingertip position is described.

When the operator points a finger toward the display 11, the finger is reflected in the captured image by the camera 15*c*. The position on the captured image pointed with the finger (fingertip position) is extracted by performing a process as described below.

Figure 8:
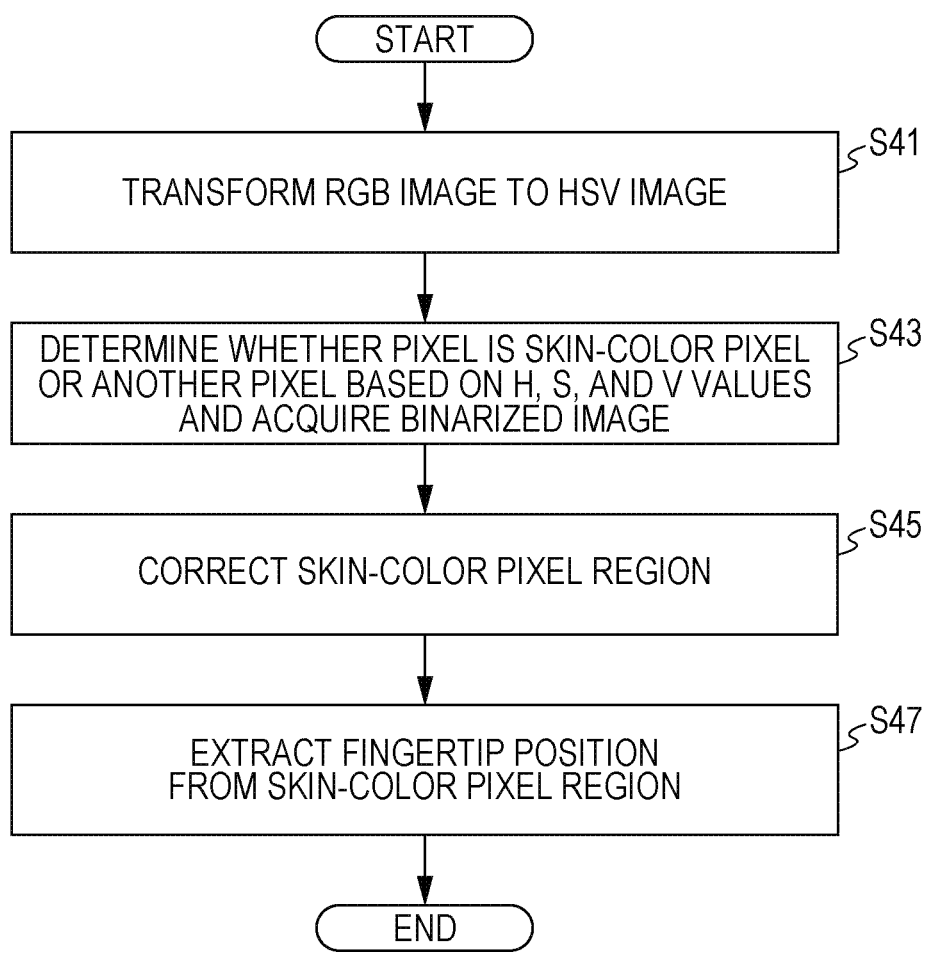
FIG. 8 is a flowchart of a process of extracting a hand portion in the first embodiment.

FIG. 8 is a flowchart of a process of extracting a hand portion in the present embodiment. A process flow is described along FIG. 8.

The computer 13 receives a captured image from the wearable terminal 15. The captured image is image data formed of RGB color components. The computer 13 applies the following arithmetic operation on that image data for transformation to HSV data (step S41) to appropriately determine whether each pixel represents a skin-color region. Here, H represents hue, S represents chroma, and V represents lightness, and these are calculated as follows from the brightness of each of RGB color components.

First, the lightness V is represented by $V=\max(R,G,B)$.

Here, R, G, and B represent brightness of RGB color components of each pixel configuring a captured image, and the value of the brightest color component among these is the lightness V.

By using the lightness calculated by the above equation, the chroma S is calculated as $S=(V-\min(R,G,B))/V$.

The hue H is calculated as $H=60\times(G-B)/S$ when V=R (that is, when R is the brightest among R, G, and B), $H=120+60\times(R-R)/S$ when V=G, and $H=180+60\times(R-G)/S$ when V=B.

However, to make the above H value as a positive numerical value, when the calculation result of the above equation is a negative value, 360 is added to that calculation result. Also, for a process with values of eight bits, the calculation result is further divided by 2.

Based on this-calculated values of the HSV data, the computer 13 performs binarization based on a determination as to whether each pixel is in skin color (step S43).

As an example of a binarization determination condition, if H≥2 and H≤28, S≥46, and V≥26, the pixel is determined as a skin-color pixel, thereby setting threshold values of H, S, and V. The computer 13 makes a determination for each pixel of the captured image, and transforms a skin-color pixel to 1 (white) and transforms other pixels to 0 (black) as non-skin-color pixels.

The threshold value for use in determining whether each pixel is in skin color may be corrected in accordance with the color of the skin of the operator. In the correction, in a mode for skin color calibration, the camera 15c may be used to capture an image of the hand portion of the operator and correction values may be determined based on that captured image.

Also, in place of the fingertip of the operator, for example, when a position is pointed by using a specific pen, in the mode for skin color calibration, an image of the operator holding that pen may be captured by the camera 15c and the tip of the pen may be extracted based on that captured image. In that case, the process flow is such that "fingertip" in the embodiments is replaced by "tip of the pen".

Figure 9:
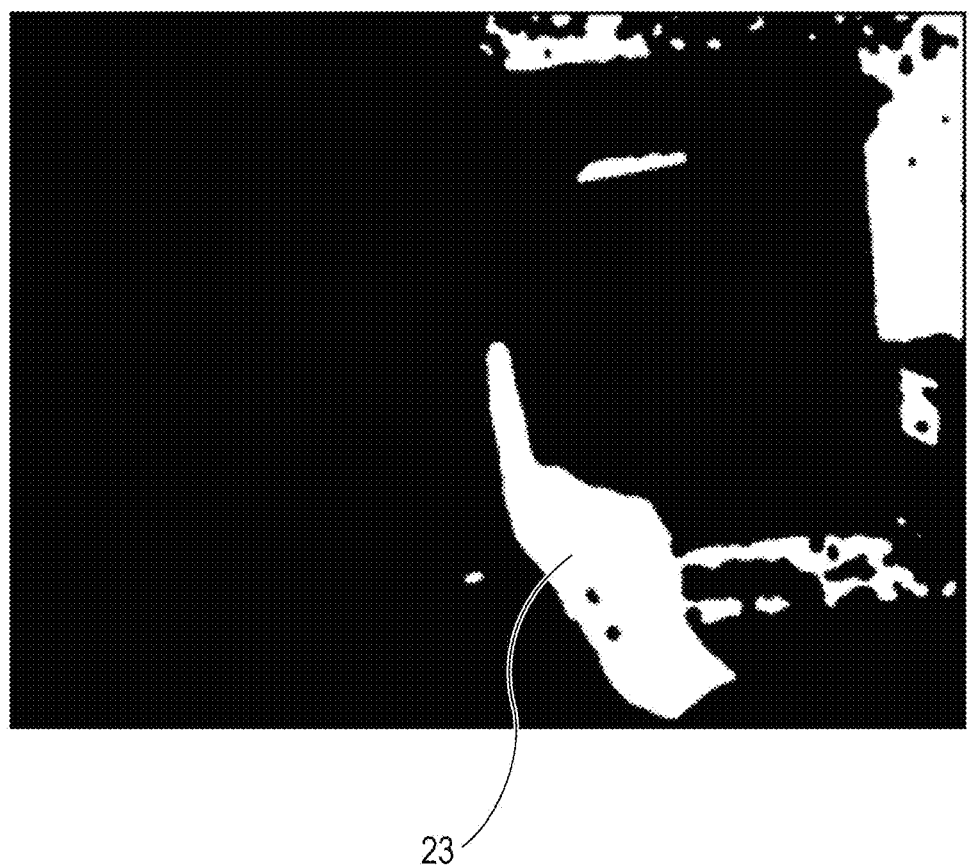
FIG. 9 is a diagram for describing one example of an extracted skin-color region in the first embodiment.

FIG. 9 is a diagram for describing one example of a captured image binarized based on the above-described determination. As depicted in FIG. 9, a hand portion 23 is extracted as a skin-color region.

Furthermore, the computer 13 removes noise and portions except the hand from the skin-color pixel region acquired by binarization (step S45). For example, the computer 13 performs the following process. On the binarized image, the computer 13 makes transformation to 1 (white) when a total value of 7×7 pixels centering at a target pixel is equal to or larger than a prescribed value and to 0 (black) when the total value is smaller than the prescribed value. The computer 13 then turns black to white and vice versa in the image, and makes transformation to 1 (white) when the total value of 7×7 pixels centering at the target pixel is equal to or larger than the prescribed value and to 0 (black) when the total value is smaller than the prescribed value. The computer 13 then again turns black to white and vice versa in the image.

By the series of processes, noise and small skin-color pixels except the hand are corrected to non-skin-color pixels. Conversely, non-skin-color pixels surrounded by skin-color pixels due to noise or illumination are corrected to skin-color pixels. The 7×7 pixels are merely an example, and a mode of not performing or only partially performing the above-described process can be thought.

Furthermore, the computer 13 performs labelling, and transforms a skin-color region with pixels smaller in number than a prescribed number of pixels to 0. With this, only the skin-color regions with pixels equal to or larger in number than the prescribed number of pixels including a portion corresponding to the hand have a value of 1, and other portions have a value of 0.

In addition, the thickness, shape, and others of fingers may be registered in advance as finger shapes and, among the extracted skin-color regions, those not similar to the registered finger shapes may be excluded.

The computer 13 then extracts a hands fingertip position from the acquired skin-color pixel region (step S47). In the present embodiment, extraction of a fingertip position is performed as follows.

In the viewport 11d on the captured image, from a top of the image, the computer 13 checks whether each pixel is a skin-color pixel (1), and takes the first skin-color pixel as the position of the fingertip of the hand.

Figure 10:
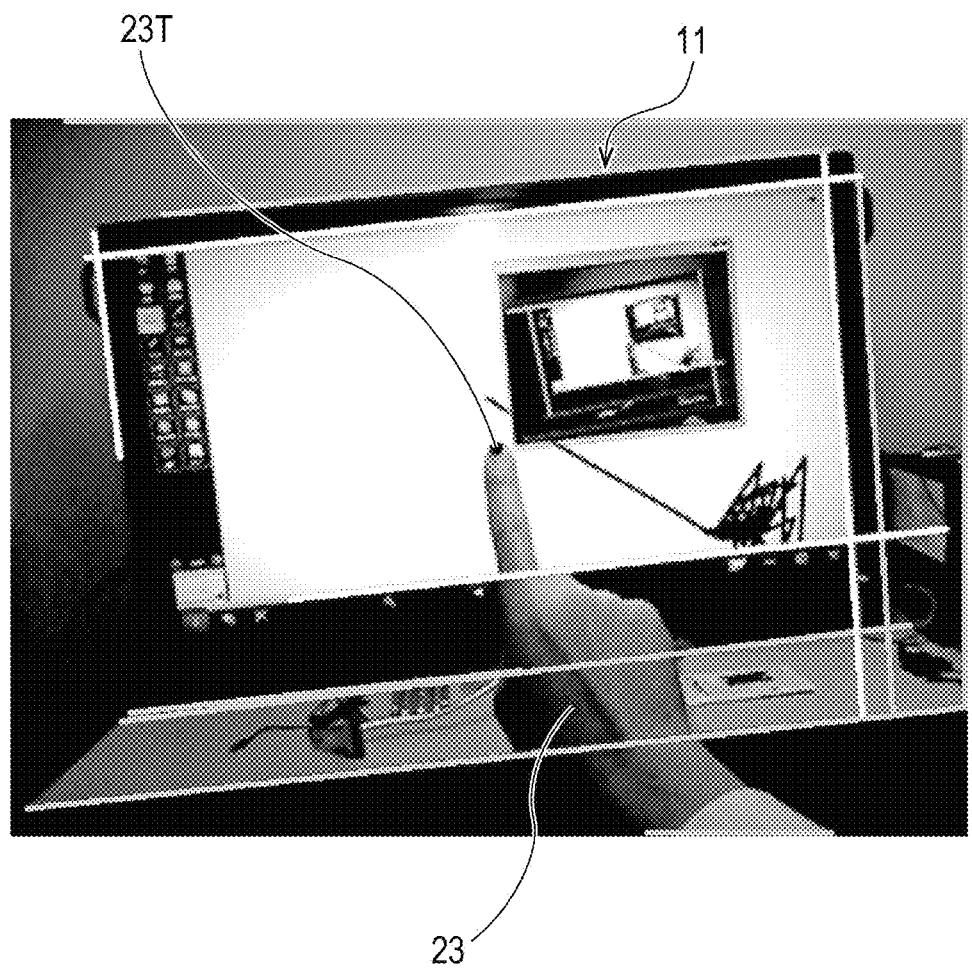
FIG. 10 is a diagram for describing a state of extracting a position of a fingertip in the first embodiment.

FIG. 10 is a diagram for describing the fingertip position extracted as a result of the above-described process. The uppermost pixel in the skin-color region is extracted as a fingertip position 23T. Alternatively, the brightest pixel among the color pixels may be taken as a fingertip position, because part of the nail of the finger often has the brightest pixel in the entire hand.

<<Process of Determining Position on Viewport Corresponding to Fingertip Position on Captured Image>>

Once the fingertip position (P(x, y) depicted in FIG. 7) on the captured image is found as described above, the computer 13 applies the projection transformation matrix H to the fingertip position on the captured image for transformation to the corresponding positions (Q(u, v) depicted in FIG. 7) on the viewport 11d.

As depicted in FIG. 7, the coordinate values of Q(u, v) are found by the following equation by using the coordinate values (x, y) of the fingertip position on the captured image.

$$(u, v) = \left( \frac{h_{11}x + h_{12}y + h_{13}}{h_{31}x + h_{32}y + 1}, \frac{h_{21}x + h_{22}y + h_{23}}{h_{31}x + h_{32}y + 1} \right) \quad (8)$$

If the coordinate values on the viewport surface of thus-calculated Q(u, v) are inside the viewport 11d, the computer 13 causes the pointer to be displayed on the calculated position.

<<Correction of Position Shift>>

The fingertip position extracted in the above-described process may be shifted by several pixels from the position where the operator desires to match the cursor. Furthermore, the visual point of the operator is slightly shifted from the visual point of the camera 15c. Therefore, the position where the operator points to the display 11 is slightly shifted from the corresponding position on the viewport found by using the captured image. In that case, to derive more appropriate coordinates of the fingertip position, a correction value defined in advance may be added to the coordinates of the extracted fingertip position.

As for the correction value, while the operator may directly input a numerical value, the correction value can be determined as follows, for example.

In a calibration mode for position shift correction, the operator points to a prescribed position on the display 11, for example, an image center, which is captured by the camera 15c. Here, the position to be pointed by the operator is desirably displayed on the viewport 11d.

Processes similar to those at steps S17 to S27 of FIG. 3 are performed on the captured image to find a pointer position corresponding to the position pointed by the operator.

An amount of the position shift of the found pointer position from the position to be pointed by the operator (for example, the image center) is stored as a correction value.

Second Embodiment

In the first embodiment, the process has been described in which the four vertexes of the display are determined from the image captured by the camera 15c of the wearable terminal 15. Then, the process has been described in which the projection transformation matrix H for correcting distortion of the four vertexes is found. Furthermore, the process has been described in which the fingertip position on the captured image is extracted. Still further, the process has been described in which the projection transformation matrix H is applied to find the position on the viewport 11d corresponding to the fingertip position. General outlines of these processes are depicted in the flowchart of FIG. 3.

However, there are cases in which four sides defining a viewport are not detected and therefore part or all of coordinate values of four vertexes are not found. Moreover, there are cases in which a fingertip position is not detected.

In a second embodiment, a process flow including such cases are described.

When the operator casts side-glances at the display 11 or the contents (color) displayed on the viewport 11*d* is close to the (color of) display frame 11*f*, part or all of four sides (four line segments) defining the viewport are not detected.

For example, if four line segments defining the viewport are not detected at all or if only one of the four line segments is detected, the computer 13 assumes that the visual line of the operator is oriented outside the captured image of the camera 15*c*, and does not detect a fingertip position or move the pointer in the viewport.

Also, if two or three of the four line segments determined as defining the viewport are detected, it is determined that, while the camera 15*c* is oriented to the direction of the display 11, the color of the contents displayed on the display 11 is close to the color of the display frame 11*f* and therefore a line segment indicating a boundary of the viewport 11*d* is not detected. In that case, the computer 13 assumes that the captured image corresponding to the previous frame of the picture data from the camera 15*c* and the position of the display 11 are not changed. Based on this assumption, a projection transformation matrix calculated for the captured image of the previous frame may be used to continue the process.

Also, when the operator does not orient the fingertip to the display 11, the fingertip position may not be detected from the captured image. In that case, the computer 13 controls display so as not to move the pointer displayed at a position on the viewport 11*d* calculated based on the captured image of the previous frame.

Alternatively, in that case, the computer 13 may control display so as to erase the pointer displayed at the position on the viewport 11*d* calculated based on the captured image of the previous frame.

Figure 11:
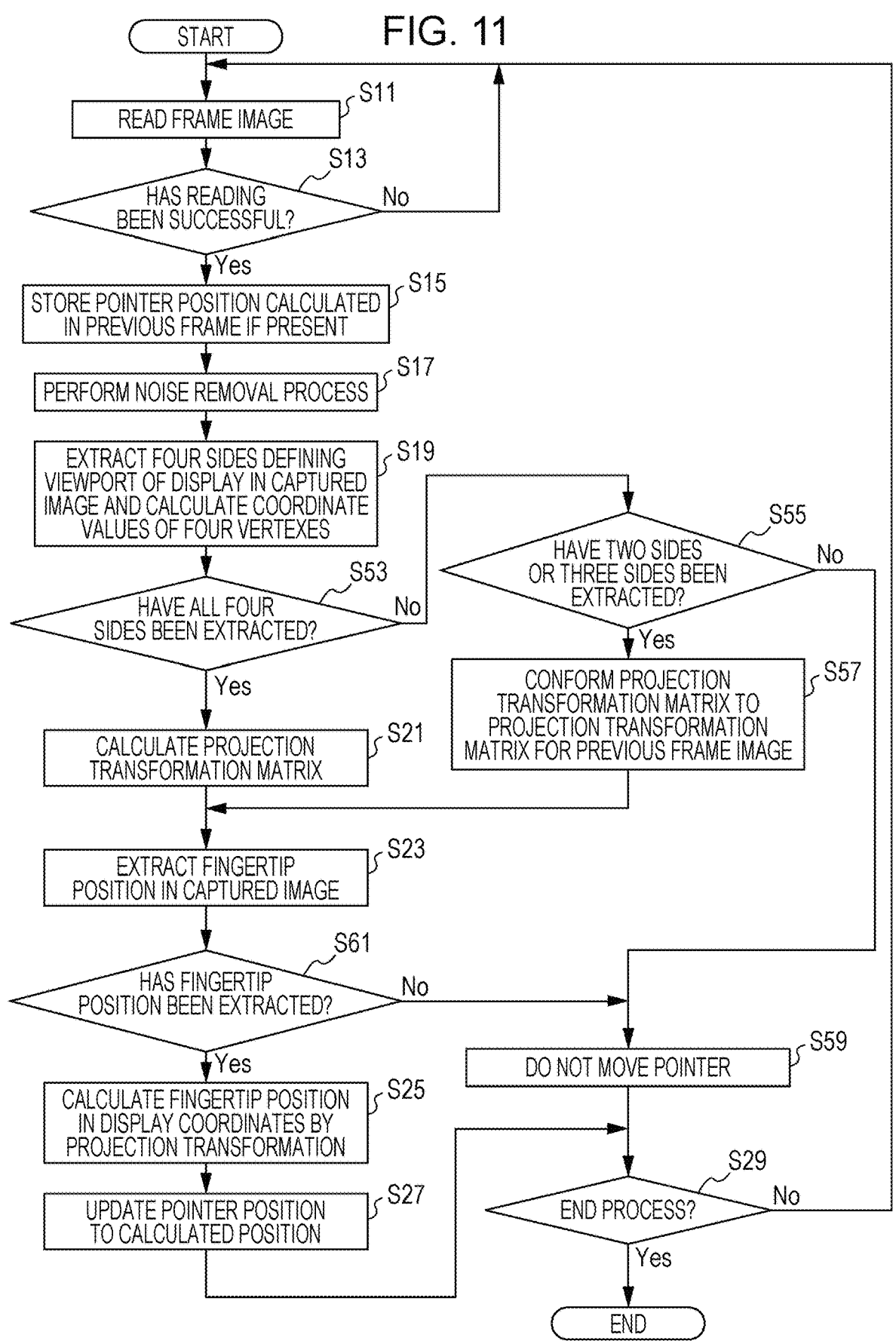
FIG. 11 is a flowchart including a process when all four sides defining a viewport are not detected in a second embodiment.

FIG. 11 and FIG. 12 are flowchart according to the present embodiment. FIG. 11 corresponds to FIG. 3 in the first embodiment, and FIG. 12 corresponds to FIG. 4 in the first embodiment.

In FIG. 11, a process similar to that of FIG. 3 is provided with the same reference character as that of FIG. 3. In the process flow depicted in FIG. 11, portions different from those of FIG. 3 are predominantly described.

In FIG. 11, the computer 13 receives a captured image corresponding to one frame of picture data transmitted from the wearable terminal 15 (step S11), removes noise (step S17), and performs a process of extracting four sides to calculate four vertexes defining a viewport (step S19).

The computer 13 then checks whether all four sides have been extracted as a result (step S53). If all four sides have been extracted (Yes at step S53), the computer 13 proceeds to subsequent processes as in FIG. 3, calculating a projection transformation matrix (step S21) and extracting a fingertip position (step S23).

On the other hand, if only part of the four sides has been extracted or four sides have not been extracted at all (No at step S53), the computer 13 then checks whether two or three of the four sides have been extracted (step S55).

If determining that two or three sides have been extracted (Yes at step S55), the computer 13 assumes that the display 11 is reflected in the captured image and only any of the sides have not been detected. Then, assuming that the captured image of the previous frame and the position of the display 11 are not changed in the picture data from the camera 15*c*, the computer 13 adopts the projection transformation matrix H adopted for the previous frame image also for the current frame. That is, with the distortion state being assumed to be the same as that in the previous frame, the same projection transformation matrix H for the previous frame is applied (step S57). Then, the routine proceeds to step S23, extracting a fingertip position.

On the other hand, if only one side has been extracted or a line segment has not been extracted at all at the above-described step S55, the routine proceeds to step S59 so as not to move the position of the pointer displayed in the viewport (step S59). If the pointer is not displayed, the non-displayed state continues. The routine then proceeds to step S29.

A flow subsequent to the process of the above-described step S23 is described.

At step 23, the computer 13 extracts the fingertip position in the captured image. As a result of this process, the computer 13 checks whether the fingertip position has been extracted (step S61). If the fingertip position has been extracted (Yes at step S61), as with FIG. 3, the computer 13 applies the projection transformation matrix H to calculate the corresponding position on the viewport (step S25), and updates the position of the displayed pointer to the calculated position (step S27). If the pointer is not displayed on the viewport 11*d*, the computer 13 causes the pointer to be displayed at the calculated position.

Then, the computer 13 checks whether a next frame image is present (step S29). If a next frame image is present (No at step S29), the computer 13 returns to the head step S11. If a next frame image is not present (Yes at step S29), the computer 13 ends the process.

If the fingertip position has not been extracted at the above-described step S61 (No at step S61), the routine proceeds to step S59 so as not to move the position of the pointer displayed in the viewport (step S59). If the pointer is not displayed, the non-displayed state continues. The routine then proceeds to step S29 to determine whether to end the process.

FIG. 12 is a flowchart of details of the process of step S19 depicted in FIG. 11. In FIG. 12, a process similar to that of FIG. 4 is provided with the same reference character. In the process flow depicted in FIG. 12, portions different from those of FIG. 4 are predominantly described.

The computer 13 transforms the captured image made of RGB color components to a gray image (step S31), performs an edge detection process (step S33) and detects line segments (step S35). The computer 13 then performs a process of extracting four line segments defining a viewport from among the detected line segments (step S37). That is, the computer 13 determines, four sides, line segments extending to a substantially horizontal or substantially vertical direction, longer than a length defined in advance, and in any of upward, downward, leftward, and rightward directions with respect to an image center of the captured image and near the image center.

Then, the computer 13 checks whether line segments conforming to the above-described condition have been extracted in the upward, downward, leftward, and rightward directions (step S71).

If four line segments in total conforming to the condition have been extracted (Yes at step S71), as with FIG. 4, the computer 13 calculates coordinate values of a point of intersection of adjacent two sides for each of the four vertexes (step S39).

On the other hand, if line segments conforming to the condition have not been extracted (No at step S71), the computer 13 does not calculate coordinate values of a point of intersection and ends the process.

According to the present embodiment, when the computer 13 does not extract the fingertip position, the pointer stands still at the position where the pointer has been displayed so far, or the display of the pointer disappears.

Therefore, when the operator stops pointing to the viewport 11d and puts the hand down, the pointer stands still at the position where the pointer has been displayed so far or the display of the pointer disappears. When the operator again points to any position in the viewport 11d, the pointer moves from the position where the pointer is displayed at standstill to the pointed position, or the pointer that has disappeared is displayed at the pointed position.

Also, when the operator oriented to the direction of the display 11 turns to another direction and the display 11 is not reflected in the captured image, the pointer stands still at the position where the pointer has been displayed so far or the display of the pointer disappears. When the operator again turns to the direction of the display 11 and points to any position in the viewport 11d, the pointer moves from the position where the pointer is displayed at standstill to the pointed position, or the pointer that has disappeared is displayed at the pointed position.

Third Embodiment

In the first and second embodiments, the process flow has been described by assuming that the number of operators having the wearable terminal 15 attached is one. However, a mode can be thought in which a plurality of operators each have the wearable terminal 15 attached thereto and use the common display 11 for a meeting and each operator points a specific position on a document displayed on the display 11 by using a pointer. This mode is such that each operator has the wearable terminal attached thereto and safely operates the pointer, instead of carrying a laser pointer.

In a third embodiment, as in the above-described meeting, a case is described in which a plurality of operators each having the wearable terminal 15 attached thereto are present.

The computer 13 may perform each process described in the first and second embodiments on the wearable terminal 15 of each operator to control display of individual pointers corresponding to the respective operators.

In that case, the computer 13 causes a plurality of pointers corresponding to the wearable terminals attached to the respective operators to be displayed on one viewport 11d. The respective pointers may be displayed in a mode identifiable from other pointers so that it can be identified which of the plurality of pointers corresponds to a specific operator (wearable terminal).

Each pointer may be displayed in a mode identifiable from other pointers by color, for example, a pointer corresponding to an operator A is in red, a pointer corresponding to an operator B is in green, and a pointer corresponding to an operator C is in blue.

Alternatively, each pointer may be assigned with a separate shape, and may be displayed so as to be identifiable by the shape. For example, the shape is any of variations including a circle, quadrangle, and star.

By contrast, a mode can be thought in which a plurality of operators operate only one pointer.

In that case, when any of the operators points to the viewport 11d, the pointer moves to that position. When a plurality of operators almost simultaneously point to the viewport 11d, an operator who operates first may be prioritized and, when that operator puts the hand down and the hand portion disappears from the captured image, the pointer may move to a position pointed by another operator.

As one example of a case when a plurality of operators are present, the mode has been described in which a plurality of pointers corresponding to a plurality of operators are displayed in a meeting. However, functions of the pointer are not limited to the function of pointing a display position. The same goes for the first and second embodiments.

As a mouse pointer to be displayed on the screen of a normal computer, operation on an object displayed in association with a click, start/end of dragging, or the like may be made.

As for the mouse, by operating a button or dial of the mouse, a click, drag, and other operations can be associated with the pointer. As for pointer operation using a wearable terminal, gestures corresponding to a click, drag, and other operations are defined in advance by the operation of the hand portion (including a nonmoving state), the shape of a finger, the direction of a fingertip, and so forth.

Alternatively, the pointer operation according to the present embodiment may correspond to normal touch operation on a touch display. If the operation of the hand portion, the shape of a finger, the direction of a fingertip, and so forth corresponding to operations such as a tap, start/end of dragging, and so forth are defined in advance as gestures, operation similar to touch operation can be made.

Still alternatively, the pointer operation may correspond to operation using an electronic pen. If gestures corresponding to operations of the electronic pen are defined in advance, rendering on the display 11 can be made without using the electronic pen. For example, a simple postscript can be superimposed on a presentation document displayed on the display 11.

As described above, (i) A screen display control method according to the present disclosure includes: by using a wearable terminal to be attached to a head of an operator to capture an image, capturing, with an image of a display having a rectangular frame and a viewport, an image of a hand portion with which the operator points to the display; by using a computer, extracting positions of vertexes of the rectangular frame in the captured image by the wearable terminal and a position pointed by the hand portion; determining, based on a position relation of the extracted positions of the vertexes and the extracted pointed position, whether a position in the viewport corresponding to the hand portion is present; and causing a pointer to be displayed at the position if present.

In this specification, the head is a portion the direction of which is changed when the operator turns the neck, and is a portion above the neck of the operator.

Also, the wearable terminal can be attached to any position on the head. Examples of its specific modes include one attachable by being hung on the ear and an eyeglasses-type terminal such as so-called smart glasses, but the wearable terminal is not limited to these. In this specification, the wearable terminal has an image sensor which captures an image.

Furthermore, the display is a display apparatus having a rectangular screen, that is, a viewport. Examples of its specific modes include a display apparatus using a liquid crystal or organic EL, but the display is not limited to these.

The rectangular shape is a quadrangle with opposing two sides parallel to each other and adjacent two sides forming a right angle, and includes a square.

Also, the viewport is a displayable region on a display and, generally, is a region with its periphery surrounded by a frame.

Furthermore, the hand portion is a portion including at least one finger of the operator and, typically, is a portion from the wrist to the fingertip.

"Capturing, with an image of a display" refers to capturing the hand portion of the operator as an image, with all or part of the display taken as a background.

Also, the computer is hardware configured predominantly of a CPU or MPU and capable of executing a program. Its specific modes are not limited. For example, the computer may be incorporated in a device, or may be an information processing device of a portable type, a transportable type, or a stationary type.

Furthermore, the captured image is an image captured by the image sensor included in the wearable terminal.

The positions of vertexes of the rectangular frame are positions of four vertexes of the rectangular viewport.

Also, the pointer is displayed in the viewport of the display to point to a specific position or a specific target displayed in the viewport. Examples of its specific mode include one displayed on the screen of a general personal computer to point to an operation target and an operation position of a mouse and a touch pad, but the pointer is not limited to these.

Furthermore, preferable modes of the present disclosure are described.

(ii) By using the computer, a gesture of the operator reflected in the captured image may be recognized, and operation in accordance with the recognized gesture may be performed on the position of the pointer.

With this, by the operator at a position away from the display making a gesture, the operation of the position of the pointer can be made in a manner similar to that of general operations such as mouse operation and touchpad operation on a computer and touch operation on a smartphone.

(iii) Four sides indicating the viewport of the display reflected in the captured image may be detected, and the positions of the vertexes may be found from positions of points of intersection of the respective sides or straight lines acquired by extending the respective sides.

With this, the positions of the vertexes of the viewport can be accurately found even if only part of the four sides indicating the viewport is reflected in the captured image.

(iv) The pointed position may be a position of a pixel positioned at an uppermost part among pixels of a skin-color region in the captured image.

With this, the pointed position can be detected by assuming that the pixel at the uppermost part in the skin-color region reflected in the captured image data indicates the position of the fingertip.

The pointed position may be a position of a brightest pixel among pixels of a skin-color region in the captured image.

Normally, a portion of the nail of the fingertip has the brightest color in the hand portion. With this, the pointed position can be detected by assuming that the pixel corresponding to the position of the nail of the finger reflected in the captured image indicates the position of the fingertip.

(vi) A skin-color region in the viewport may be extracted based on a determination as to whether each pixel belongs to a skin color, and a threshold value for use in determining whether each pixel belongs to the skin color may be changed in accordance with a configuration of color components included in contents displayed in the viewport.

With this, a situation can be avoided in which the displayed portion is erroneously detected as being the hand portion of the operator. For example, the threshold values for determination may be changed so that a range in which a pixel is determined as belonging to the skin color is narrowed when the display contents in the viewport reflected in the captured image include many colors similar to the skin color and the range in which a pixel is determined as belonging to the skin color is widened when the display contents include not so many colors similar to the skin color.

(vii) A skin color region in the viewport may be extracted based on a determination as to whether each pixel belongs to a skin color, and a widest region among regions in which adjacent pixels belong to the skin color may be taken as the skin-color region.

With this, even if a plurality of skin-color regions are extracted in the viewport, the widest region is assumed to indicate the hand portion, and therefore erroneous detection can be avoided.

(viii) When the position determined so as to correspond to the pointed position is outside the viewport, the displayed pointer may not be moved or may be erased.

With this, when the position of the pointer determined so as to correspond to the position pointed by the hand portion is outside the viewport, it is determined that the hand portion in that case does not point to a position in the viewport, and therefore unwanted movement or display of the pointer can be avoided.

(ix) The position of the pointer corresponding to the pointed position may be determined by applying projection transformation to the positions of the vertexes and the pointed position in the captured image so that the positions of the vertexes form a rectangle and determining the position of the pointer as a position where a fingertip is to be projected in the viewport.

With this, even if the operator is not at a position directly confronting the display, the pointer can be displayed at the position intended by the operator.

(x) The computer may acquire, from each of a plurality of wearable terminals respectively attached to heads of a plurality of operators, a captured image with the display and the hand portion of each of the operators captured therein, extract the positions of the vertexes of the rectangular frame of the display and the position pointed by the hand portion of each of the operators in the captured image from each of the wearable terminals, determine, based on the position relation of the extracted positions of the vertexes and the extracted pointed position, whether the position in the viewport corresponding to the hand portion of each of the operators is present, and cause the pointer to be displayed at the position if present to allow one pointer to be operated by each of the operators.

With this, for example, with a plurality of participants in a meeting each having attached thereto the wearable terminal individually, the pointer can be operated without exchanging the wearable terminal among the participants.

(xi) The computer may acquire, from each of a plurality of wearable terminals respectively attached to heads of a plurality of operators, a captured image with the display and the hand portion of each of the operators captured therein, extract the positions of the vertexes of the rectangular frame of the display and the position pointed by the hand portion of each of the operators in the captured image from each of the wearable terminals, determine, based on the position relation of the extracted positions of the vertexes and the extracted pointed position, whether the position in the viewport corresponding to the hand portion of each of the operators is present, and cause a pointer corresponding to each of the operators to be displayed at the position if present so that a correspondence with each of the operators can be identified.

With this, for example, with a plurality of participants in a meeting each having attached thereto the wearable terminal individually, the pointer corresponding to each participant can be operated.

(xii) A screen display control program according to the present disclosure causes a computer to perform: acquiring, from a wearable terminal to be attached to a head of an operator, an image having captured therein a display having a rectangular frame and a viewport and also a hand portion with which the operator points to the display; extracting positions of vertexes of the rectangular frame in the captured image by the wearable terminal and a position pointed by the hand portion; determining, based on a position relation of the extracted positions of the vertexes and the extracted pointed position, whether a position in the viewport corresponding to the hand portion is present; and causing a pointer to be displayed at the position if present.

According to the present disclosure, the operator at a location away from the display can operate the pointer at that location. Furthermore, even if the visual point of the operator is shifted from the visual point of image capturing by the wearable terminal attached to the head of the operator, the position of the pointer to be displayed on the display so as to correspond to the position pointed by the operator can be determined with a small calculation amount and without discomforting the operator.

(xiii) The screen display control program may cause the computer to further perform recognizing a gesture of the operator reflected in the captured image, and performing an operation in accordance with the recognized gesture at the position of the pointer.

With this, by the operator at a position away from the display making a gesture, the operation of the position of the pointer can be made in a manner similar to that of general operations such as mouse operation and touchpad operation on a computer and touch operation on a smartphone.

(xiv) A screen display control system according to the present disclosure includes: a display having a rectangular frame and a viewport; a wearable terminal to be attached to a head of an operator to capture, with an image of the display, an image of a hand portion with which the operator points to the display; a pointer processing unit which extracts positions of vertexes of the rectangular frame in the captured image by the wearable terminal and a position pointed by the hand portion and determines, based on a position relation of the extracted positions of the vertexes and the extracted pointed position, whether a position in the viewport corresponding to the hand portion is present; and a display processing circuit which causes a pointer to be displayed at the position if present.

According to the present disclosure, the operator at a location away from the display can operate the pointer at that location. Furthermore, even if the visual point of the operator is shifted from the visual point of image capturing by the wearable terminal attached to the head of the operator, the position of the pointer to be displayed on the display so as to correspond to the position pointed by the operator can be determined with a small calculation amount and without discomforting the operator.

(xv) The screen display control system may further include a gesture recognizing unit which recognizes a gesture of the operator reflected in the captured image and a display processing unit which performs operation in accordance with the recognized gesture on the position of the pointer.

With this, by the operator at a position away from the display making a gesture, the operation of the position of the pointer can be made in a manner similar to that of general operations such as mouse operation and touchpad operation on a computer and touch operation on a smartphone.

Favorable modes of the present disclosure include combinations of any of the plurality of favorable modes described above.

Other than the above-described embodiments, the present disclosure can have various modification examples. It is be understood that these modification examples may belong to the scope of the present disclosure and the present disclosure may include all modifications within the sense and scope of the equivalents of the scope of the aspects.

The present disclosure contains subject matter related to that disclosed in Japanese Priority Patent Application JP 2017-216380 filed in the Japan Patent Office on Nov. 9, 2017, the entire contents of which are hereby incorporated by reference.

It should be understood by those stilled in the art that various modifications, combinations, sub-combinations and alterations may occur depending on design requirements and other factors insofar as they are within the scope of the appended claims or the equivalents thereof.

What is claimed is:
1. A screen display control method comprising:
by using a wearable terminal to be attached to a head of an operator to capture an image, capturing, with an image of a display having a rectangular frame and a viewport, an image of a hand portion with which the operator points to the display;
by using a computer, extracting positions of vertexes of the rectangular frame in the captured image by the wearable terminal and a position pointed by the hand portion;
determining, based on a position relation of the extracted positions of the vertexes and the extracted pointed position, whether a position in the viewport corresponding to the hand portion is present; and
causing a pointer to be displayed at the position if present, wherein
the pointed position is a position of a pixel positioned at an uppermost part among pixels of a skin-color region in the captured image.
2. The screen display control method according to claim 1, further comprising:
by using the computer, recognizing a gesture of the operator reflected in the captured image; and
performing operation in accordance with the recognized gesture on the position of the pointer.
3. The screen display control method according to claim 1, wherein
four sides indicating the viewport of the display reflected in the captured image are detected, and the positions of the vertexes are found from positions of points of intersection of the respective sides or straight lines acquired by extending the respective sides.
4. The screen display control method according to claim 1, wherein
the pointed position is a position of a brightest pixel among pixels of a skin-color region in the captured image.
5. The screen display control method according to claim 1, wherein
the skin-color region in the viewport is extracted based on a determination as to whether each pixel belongs to a skin color, and a threshold value for use in determining whether each pixel belongs to the skin color is changed in accordance with a configuration of color components included in contents displayed in the viewport.

6. The screen display control method according to claim 1, wherein
the skin-color region in the viewport is extracted based on a determination as to whether each pixel belongs to a skin color, and a widest region among regions in which adjacent pixels belong to the skin color is taken as the skin-color region.

7. The screen display control method according to claim 1, wherein
when the position determined so as to correspond to the pointed position is outside the viewport, the displayed pointer is not moved or is erased.

8. The screen display control method according to claim 1, wherein
the position of the pointer corresponding to the pointed position is determined by applying projection transformation to the positions of the vertexes and the pointed position in the captured image so that the positions of the vertexes form a rectangle and determining the position of the pointer as a position where a fingertip is to be projected in the viewport.

9. The screen display control method according to claim 1, wherein the computer
acquires, from each of a plurality of wearable terminals respectively attached to heads of a plurality of operators, a captured image with the display and the hand portion of each of the operators captured therein,
extracts the positions of the vertexes of the rectangular frame of the display and the position pointed by the hand portion of each of the operators in the captured image from each of the wearable terminals,
determines, based on the position relation of the extracted positions of the vertexes and the extracted pointed position, whether the position in the viewport corresponding to the hand portion of each of the operators is present, and
causes the pointer to be displayed at the position if present to allow one pointer to be operated by each of the operators.

10. The screen display control method according to claim 1, wherein the computer
acquires, from each of a plurality of wearable terminals respectively attached to heads of a plurality of operators, a captured image with the display and the hand portion of each of the operators captured therein,
extracts the positions of the vertexes of the rectangular frame of the display and the position pointed by the hand portion of each of the operators in the captured image from each of the wearable terminals,
determines, based on the position relation of the extracted positions of the vertexes and the extracted pointed position, whether the position in the viewport corresponding to the hand portion of each of the operators is present, and
causes a pointer corresponding to each of the operators to be displayed at the position if present so that a correspondence with each of the operators can be identified.

11. A non-transitory computer readable storage medium storing a screen display control program, the program causing a computer to perform:
acquiring, from a wearable terminal to be attached to a head of an operator, an image having captured therein a display having a rectangular frame and a viewport and also a hand portion with which the operator points to the display;
extracting positions of vertexes of the rectangular frame in the captured image by the wearable terminal and a position pointed by the hand portion;
determining, based on a position relation of the extracted positions of the vertexes and the extracted pointed position, whether a position in the viewport corresponding to the hand portion is present; and
causing a pointer to be displayed at the position if present, wherein
the pointed position is a position of a pixel positioned at an uppermost part among pixels of a skin-color region in the captured image.

12. The non-transitory computer readable storage medium according to claim 11, the program causing the computer to further perform:
recognizing a gesture of the operator reflected in the captured image; and
performing an operation in accordance with the recognized gesture at the position of the pointer.

13. A screen display control system comprising:
a display having a rectangular frame and a viewport;
a wearable terminal to be attached to a head of an operator to capture, with an image of the display, an image of a hand portion with which the operator points to the display;
a pointer processing unit which extracts positions of vertexes of the rectangular frame in the captured image by the wearable terminal and a position pointed by the hand portion and determines, based on a position relation of the extracted positions of the vertexes and the extracted pointed position, whether a position in the viewport corresponding to the hand portion is present; and
a display processing circuit which causes a pointer to be displayed at the position if present, wherein
the pointed position is a position of a pixel positioned at an uppermost part among pixels of a skin-color region in the captured image.

14. The screen display control system according to claim 13, further comprising:
a gesture recognizing unit which recognizes a gesture of the operator reflected in the captured image; and
a display processing unit which performs operation in accordance with the recognized gesture on the position of the pointer.

* * * * *